(12) United States Patent
Germann et al.

(10) Patent No.: US 10,956,985 B1
(45) Date of Patent: Mar. 23, 2021

(54) SCALABLE, SERVICE-BASED ARCHITECTURE FOR EFFICIENTLY PROCESSING ACCRUAL-BASIS, OUT-OF-ORDER EVENTS

(71) Applicant: Amazon Technologies, Inc., Seattle, WA (US)

(72) Inventors: Joerg Germann, Vancouver (CA); Jie Gao, Coquitlam (CA); Galen Gong, Vancouver (CA); Kyle Malong, Vancouver (CA); Bal Jayme Martin Nodora, New Westminster (CA); Anand Rathi, Redmond, WA (US); Pascal Schoenhardt, North Vancouver (CA); Ryan Schwartz, Vancouver (CA); Dale Thoma, Vancouver (CA); Victoria Wong, Richmond (CA); Yu Yi, Vancouver (CA); Desmond Zhou, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 799 days.

(21) Appl. No.: 15/274,194

(22) Filed: Sep. 23, 2016

(51) Int. Cl.
*G06Q 40/00* (2012.01)
*G06F 16/23* (2019.01)

(52) U.S. Cl.
CPC ......... *G06Q 40/12* (2013.12); *G06F 16/2365* (2019.01)

(58) Field of Classification Search
None
See application file for complete search history.

(56) References Cited

U.S. PATENT DOCUMENTS

| | | | |
|---|---|---|---|
| 8,498,939 B1 * | 7/2013 | Gupta | G06Q 30/0637 705/39 |
| 8,725,642 B2 * | 5/2014 | Fordyce, III | G06Q 20/22 705/44 |
| 2002/0091991 A1 * | 7/2002 | Castro | G06F 9/06 717/106 |
| 2003/0028495 A1 * | 2/2003 | Pallante | G06Q 20/00 705/78 |
| 2003/0158873 A1 * | 8/2003 | Sawdon | G06F 16/10 |
| 2003/0159007 A1 * | 8/2003 | Sawdon | G06F 11/1466 711/154 |
| 2003/0229900 A1 * | 12/2003 | Reisman | H04N 21/42204 725/87 |
| 2005/0131798 A1 * | 6/2005 | Eisler | G06Q 40/04 705/37 |
| 2008/0120129 A1 * | 5/2008 | Seubert | G06Q 10/10 705/35 |
| 2010/0211554 A1 * | 8/2010 | Reid | G06F 16/2358 707/703 |
| 2016/0078103 A1 * | 3/2016 | Novik | G06F 16/248 707/725 |
| 2018/0260890 A1 * | 9/2018 | Sass | G06Q 40/025 |

* cited by examiner

*Primary Examiner* — Fateh M Obaid
(74) *Attorney, Agent, or Firm* — Thomas | Horstemeyer LLP

(57) ABSTRACT

Deferred revenue calculations can be necessary in an accrual-basis accounting model where a subscription or other type of sale is conducted that requires deferred revenue recognition. A snapshot state corresponding to the current state of a particular deferral can be generated. Out of order deferred events can also occur. The current state of the deferral can also be published in a downstream system.

20 Claims, 7 Drawing Sheets

SCALABLE, SERVICE-BASED ARCHITECTURE FOR EFFICIENTLY PROCESSING ACCRUAL-BASIS, OUT-OF-ORDER EVENTS

BACKGROUND

Transactions involving deferred revenue calculation and deferred revenue recognition are increasing in frequency. Performing deferred revenue calculations is increasingly important in an accrual-basis accounting model. As the volume of these transactions and calculations increases, scaling issues can proliferate. Additionally, the processing of out of order events can be challenging.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
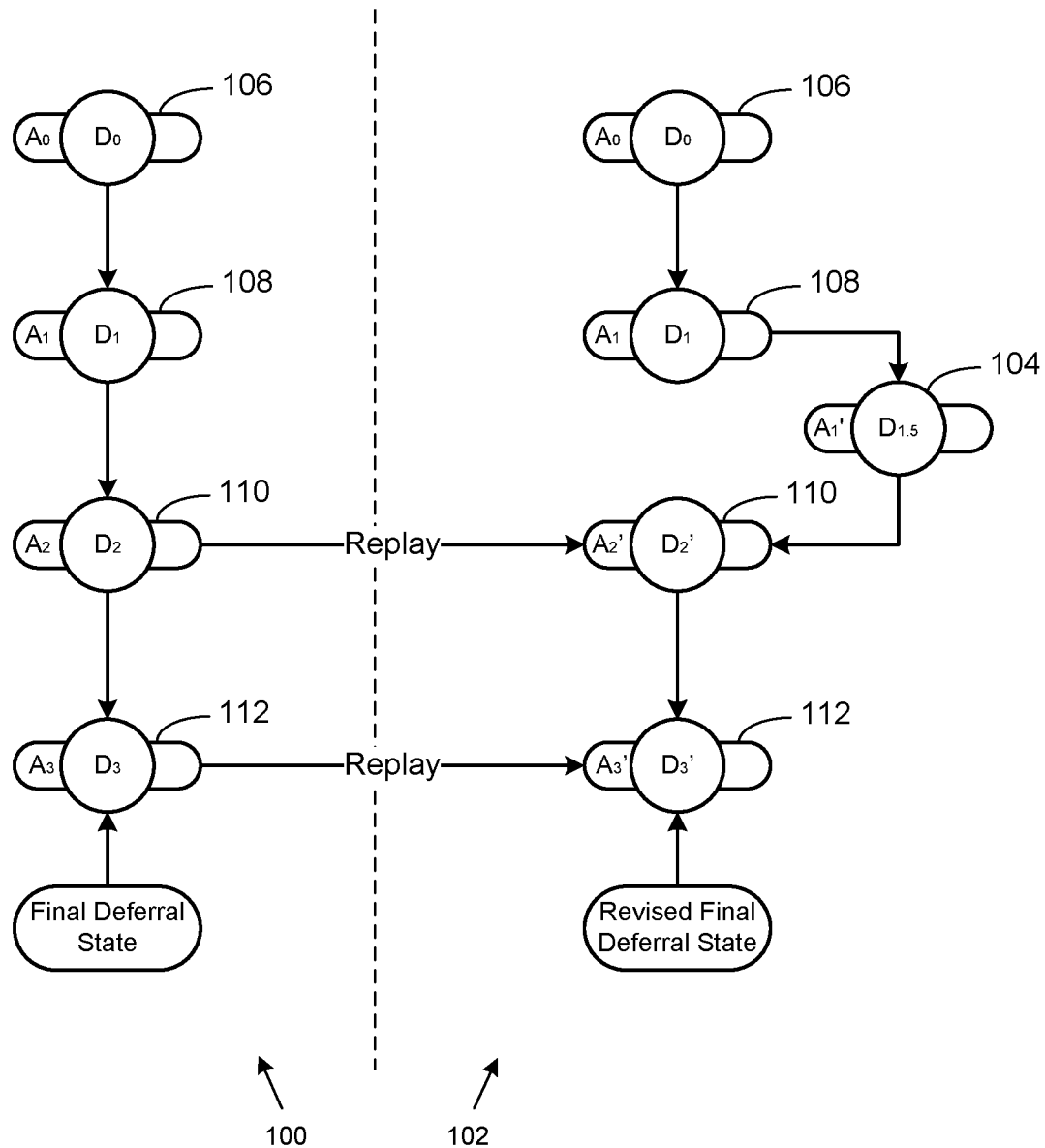
FIG. 1 is a pictorial diagram illustrating a snapshot state according to embodiments of the disclosure.

The present application is directed to processing deferral calculations for transactions that result in deferred revenue events that must be accounted for and tracked within a ledger system. Deferral calculations can also be made for other types of deferred events, such as fixed asset depreciation, employee bonus amortization. Embodiments of the disclosure can perform deferred revenue or cost calculations according to a deferred revenue schedule or a deferral schedule that is associated with a particular type of transaction. The deferral schedule can also be defined by or include an amortization function. For example, a subscription purchase sold by a business for a subscription having a one year term might involve a transaction in which a user is charged an upfront fee in exchange for a year of services or privileges. From an accounting perspective, an accrual-basis accounting model might require that the revenue, or the upfront fee, be credited to the business on a deferred basis, as the subscription does not merely contemplate an upfront revenue event. Instead, the subscription also involves a liability over the course of the subscription term that must be accounted for.

In another example, a sale of a post-paid or pre-paid subscription, such as a wireless service plan or a music streaming, might also require similar considerations from an accounting perspective. As an added complexity, such a subscription might involve a revenue sharing agreement whereby deferred revenue is shared between multiple entities. For example, some of the deferred revenue might be associated with a sales agent making a sale, and another portion of the deferred revenue might be associated with a subscription provider or artists entitled to royalties. In modern businesses, as accrual-basis accounting is often used, revenues are reported when they are actually earned rather than when the fee or cash is received for a subscription. Additionally, expenses associated with providing services to customers are often matched with the earned revenues.

Therefore, by employing an accrual-basis accounting model in an environment in which subscription sales are increasingly used for software, services, and other goods, accurately accounting for these deferred revenue events becomes an increasingly complicated technical challenge. Additionally, accounting for changes in calculations that are performed with respect to these events is also an increasingly complicated technical challenge. For example, a user might purchase a year-long subscription to a service, such as a discounted shipping benefit. The user might later cancel the service and be entitled to a pro-rated refund if the terms and conditions of the subscription allow such a cancellation. In this scenario, a recalculation of the deferred revenue and expenses associated with the subscription is required. In some accounting systems, performing these recalculations might require data-intensive and time-intensive unwinding and/or reversal of previously made calculations.

Additionally, performing calculations related to deferred events often results in a significant volume of calculations that are concentrated at certain calendar date milestones, such as the end of the week, the end of the month, the end of the year, tax filing deadlines, end-of-quarter, or other calendar date milestones that might be of interest to a business. These clustered calculations can result in a significant load on computing resources. In a business environment in which applications and services across an enterprise are hosted on shared computing resources, these milestone dates can result in an outsized share of computing resources being consumed for the purposes of making deferred event calculations.

Accordingly, embodiments of the disclosure can address some of the issues that are outlined above by employing a unique data model and a unique computational architecture that allows for changes to be made to deferred events with less impact on the system. Additionally, the effect of milestone calendar dates on computing infrastructure can be mitigated by spreading deferred revenue calculations over a period of time.

Accordingly, reference is now made to FIG. 1, which illustrates an example of how a deferral can be represented utilizing the data model employed by examples of this disclosure. In the context of this disclosure, a "deferral" or a "deferral record" is a representation of revenue and obligations according to a deferral schedule. A deferral schedule can be defined for a particular type of subscription, item, or other item associated with a transaction. A deferral schedule can vary from item to item and be customized by users of the system. For example, a particular item might be associated with a one-year term. A deferral schedule can also combine a short term deferral schedule and long term deferral schedule for a particular deferral that has multiple components. For example, a particular deferral might specify a particular amortization function for the first two years of the deferral and a different amortization function for the subsequent time period associated with the deferral. Accordingly, the deferral schedule can define revenue and expense amounts that should be accrued at various points throughout the year.

These amounts can be expressed as a percentage of a transaction amount or an initial price of the subscription or in absolute amounts.

In the example shown in FIG. 1, a deferral is represented in a "before" and "after" state by snapshot states 100 and 102. In other words, the difference between the two snapshot states 100 and 102 is the introduction of a particular transaction that affects the calculations associated with the deferral represented by the snapshots. As will be described herein, according to the data model employed by embodiments of the disclosure, the state of a deferral is stored in a "snapshot" that represents the transactions and deferred revenue and expense calculations associated with a deferral. When a new transaction or a new item associated with a particular deferral occurs, a copy of the most recent snapshot is created, and copy is modified with the new transaction information. In this way, the data model promotes efficient use of computing resources by not requiring a potentially complex data structure in which the snapshot state is represented to be unwound.

With respect to snapshot state 100, various deferred events 106, 108, 110, and 112 are depicted. The deferred events are also identified by D0, D1, D2, and D3. The deferred events can be specified by a deferral schedule associated with a particular subscription, item, or transaction that is associated with the deferral. For example, the deferral schedule can specify that a certain percentage of a subscription fee should be recognized at a particular point in time after the subscription fee was collected by a business. The deferral schedule, in the example of snapshot state 100, can specify that the subscription fee be recognized on a quarterly schedule. The deferral schedule can also specify expense adjustments that can be made to each revenue figure on a quarterly basis. In any scenario, the deferral schedule can specify how a calculation to arrive at a numerical value "A" should be made. The numerical value A can represent a running profit or revenue figure associated with the snapshot state 100. The numerical value A can also represent a profit or revenue figure associated with a particular point on a deferral schedule. The value A can further represent multiple revenue or profit calculations that are performed as specified by the deferral schedule. The deferred event 112 can also represent the final or current state of the deferral in some examples.

Snapshot state 102 represents the state of the deferral after a transaction record is received by the system. The transaction record can include information regarding an additional deferred event 104 that should be incorporated into the deferral. The system can make a copy of the most recent snapshot state 100 to incorporate the deferred event 104. The deferred event 104 can, in one example, be a user cancellation, a service charge, or any other deferred event 104 that can be specified as a possible deferred event by a deferral schedule. The deferred event 104, in this example, is an "out-of-order" deferred event, which means it is slotted to be inserted into the snapshot state 102 before other deferred events that are already in the snapshot state 102. In other words, the deferred event 104 predates deferred events 110 and 112 in the deferral schedule.

Deferred event 104 might affect a numerical calculation associated with deferred events 110 and 112 in the deferral. For example, if a user purchases a particular benefit with an extended term, such as a warranty or a membership service, and the member renews or is gifted the same benefit before expiration, this is an example of an out of order event that can affect the calculations associated with deferred events 110 and 112.

Accordingly, a system according to embodiments of the disclosure can initiate replay of the deferred events 110 and 112 to reflect an updated or revised state of the deferral in the snapshot state 102, which now represents the most recent state of the deferral.

Therefore, examples of this disclosure can provide a framework in which deferral calculations can be performed efficiently and allow for modification of deferral calculations that are caused by later-arriving out-of-order deferred events.

Figure 2:
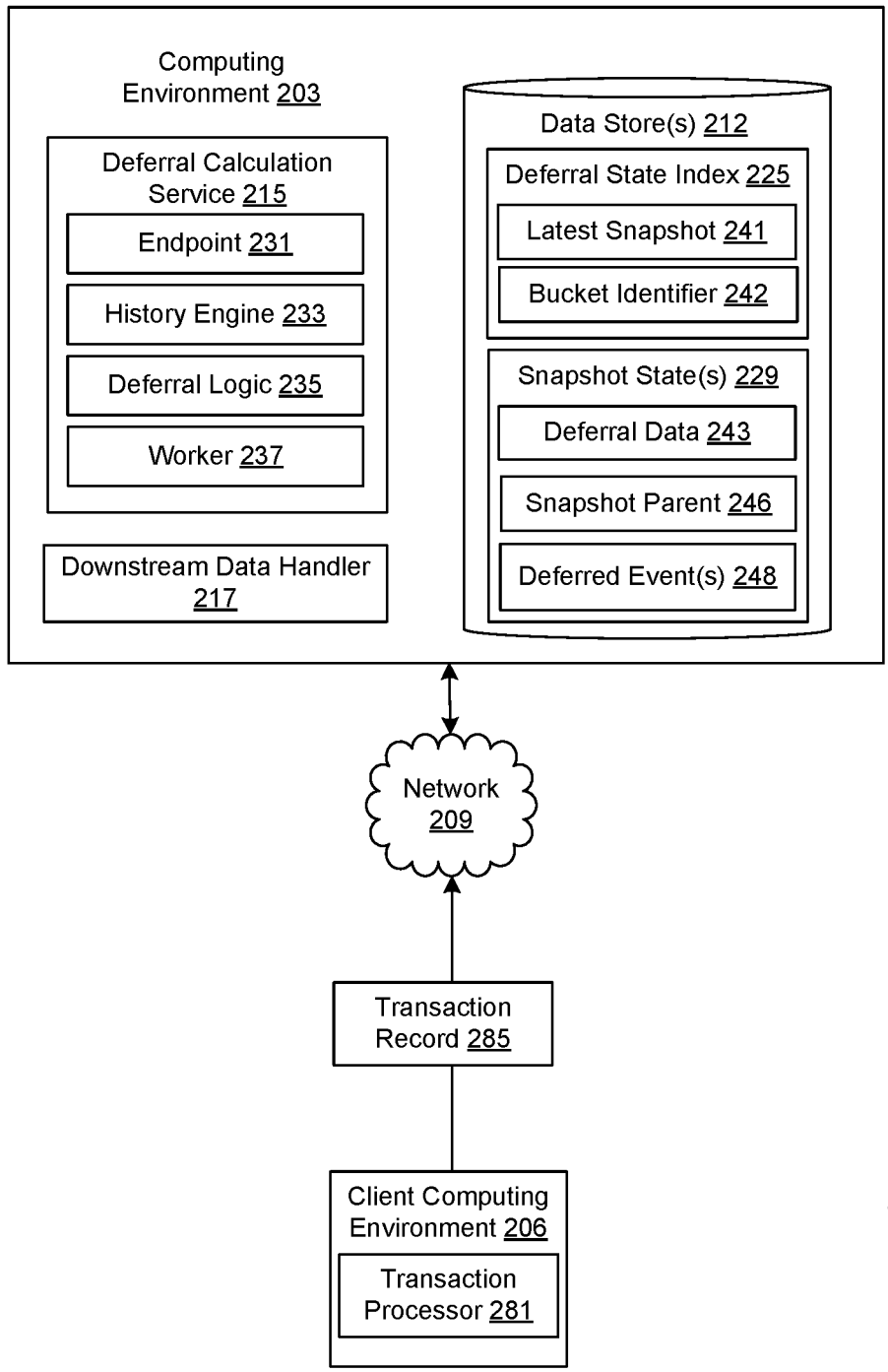
FIG. 2 is a block diagram of a networked environment according to various embodiments of the present disclosure.

With reference to FIG. 2, shown is a networked environment 200 according to various embodiments. The networked environment 200 includes a computing environment 203 and one or more client computing environment 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 and client computing environment 206 can comprise, for example, a server computer or any other system providing computing capability. Alternatively, the computing environment 203 and client computing environment 206 can employ a plurality of computing devices that can be arranged, for example, in one or more server banks, computer banks, or other arrangements. Such computing devices can be located in a single installation or may be distributed among many different geographical locations. For example, the computing environment 203 and client computing environment 206 can include a plurality of computing devices that together can comprise a hosted computing resource, a grid computing resource, and/or any other distributed computing arrangement. In some cases, the computing environment 203 and client computing environment 206 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a deferral calculation service 215, a downstream data handler 217, and other applications, services, processes, systems, engines, or functionality not discussed in detail herein. The deferral calculation service 215 is executed to calculate deferrals that are associated with transactions submitted from upstream clients. Upstream clients can include one or more client computing environment 206 or other applications within the computing environment 203. In one example, an upstream client can include a site that processes a sales transaction for a subscription, or any other item that involves deferred revenue and/or deferred expense accounting requirements. As noted above, an upstream client might process a purchase transaction for a yearly or monthly subscription in which payment is obtained up-front but where revenue and/or expenses must be recognized over time under an accrual-basis accounting model. Accordingly, the deferral calculation service 215 can as a service that other systems, users and/or applications can utilize to perform deferred revenue calculations on their behalf in a scalable fashion.

The deferral calculation service 215 can have various modules that provide functionality that enables deferred revenue calculations as described herein. The endpoint 231 is an interface or portal through which users of the deferral calculation service 215 can interact. The endpoint 231 can provide a portal that can be viewed using a browser by a user. The portal can allow a user to view and/or manage the deferrals that are housed in the data store 212 by the deferral calculation service 215. The portal can also allow a user to define or upload a deferral schedule that defines a particular deferral tracked by the deferral calculation service 215. A deferral schedule can specify a schedule for deferred events related to a particular transaction, such as a sale of a subscription. The deferred events can be specified relative to an initial transaction date or on particular calendar days, weeks, months, etc., during a particular calendar year or fiscal year. The deferred events can further be defined in terms of a percentage of a transaction amount or in absolute amounts. The deferred events can further specify royalty splits, revenue sharing splits, or any other additional parameters or variables that can be defined by the deferral schedule.

The endpoint 231 can also provide an application programming interface (API) through which an upstream client can submit transaction records 285 to the deferral calculation service 215. For example, upon the sale or cancellation of a subscription or other item involving deferred revenue calculations, a client can submit a transaction record 285 that identifies the transaction data as well as a deferral in the data store 212 to which the transaction corresponds. The deferral calculation service 215 can perform deferred revenue calculation in response to receiving such a transaction record 285. The deferral calculation service 215 can also perform validation of a transaction record 285 according to a deferral schedule or other validation data associated with a deferral that is housed in the data store. Upon receiving a transaction record 285, the endpoint 231 can then pass the record to the history engine 233.

The history engine 233 can determine whether a transaction record 285 has already been converted into or processed as a deferred event 248 corresponding to a deferral in the data store 212. The history engine 233 can also determine whether a transaction record 285 would result in an out-of-order deferred event 248. In other words, the history engine 233 can determine whether a deferred event 248 corresponding to a transaction record 285 predates other deferred events 248 associated with a particular deferral. The history engine 233 can then initiate replay of the deferred events 248 that follow the deferred event 248 to facilitate determination of the current status of a deferral.

The worker 237 can perform the task of deferred revenue calculations that correspond to the various deferrals housed in the data store 212. The worker 237 can "visit" a deferral by determining whether a bucket identifier 242 corresponding to the deferral indicates that it is time to perform deferral revenue calculations for a particular deferral. In this way, the worker 237 can perform deferred revenue calculation at a future point in time but by their respective due dates or calculation deadlines while spreading computational load over a period of time. The mechanism by which the bucket identifier 242 can be generated and inform the worker 237 as to when deferred revenue calculations should be performed is described in further detail below.

The downstream data handler 217 can publish the results of deferred revenue calculations performed by the deferral calculation service 215. In one example, the downstream data handler 217 can publish the current state of a particular deferral into a general ledger system or database in which financial transactions are stored or archived on behalf of an enterprise.

The data stored in the data store 212 includes, for example, a deferral state index 225, and one or more snapshot state 229. In this disclosure, a snapshot state 229 is also referred to as a snapshot state, as a snapshot state 229 indicates a snapshot of a state of a particular deferral that is housed in the data store 212. In one embodiment, the deferral state index 225 can be housed in a first data store 212, and the snapshot states 229 can be housed in a separate data store 212. In another embodiment, the deferral state index 225 can be housed in a relational database while the snapshot states 229 can be housed in a non-relational database.

The deferral state index 225 can include an identifier that corresponds to each deferral that is housed within the data store 212. In other words, the deferral state index 225 can include an entry that uniquely identifies a particular deferral and the most recent snapshot state 229 that represents the current state of the deferral. The latest snapshot 241 represents a pointer or the location within the snapshot states 229 of the most recently generated snapshot state 229 for a particular deferral. The deferral state index 225 can also include a bucket identifier 242 that is assigned to a particular deferral. The bucket identifier 242 can be used by the worker 237 to determine when a particular deferral should be visited and the state of the deferral determined. The worker 237 can determine the state of a deferral by visiting the latest snapshot 241 and performing revenue calculations of the snapshot state 229 as specified by a corresponding deferral schedule. The bucket identifier 242 can be a timestamp that is randomly generated by the endpoint 231 that identifies a time (e.g. in seconds) that is randomly chosen between a time when a transaction record corresponding to a particular deferral is received and a deferral due date by when deferral calculations should or must be completed.

Each snapshot state 229 can identify a deferral to which they respectively correspond. The snapshot state 229, in one example, can include an identifier corresponding to the deferral, where the identifier uniquely identifies the deferral within the deferral state index 225. The deferral data 243 includes various data about a particular deferral. For example, the deferral data 243 can specify a deferral schedule for a particular deferral. The deferral data 243 can also include data with which a transaction record from an upstream client can be validated for data formatting issues, authentication, or other validation parameters. The deferral data 243 can also specify how to and what downstream system deferral calculations should be published by the downstream data handler 217.

A snapshot state 229 can include a link to a snapshot parent 246. The snapshot parent 246 is a link to the previously generated snapshot state 229 that was generated prior to creation of the current snapshot state 229. The data store 212 can archive the snapshot states 229 generated for the various deferrals in this way so that the state of a deferral at any particular point in time in the past can be determined. In some embodiments, the snapshot states 229 for a particular deferral are stored as a linked list where each snapshot state 229 contains a link to a parent or child snapshot state 229. The linked list can be ordered according to a timestamp associated with the snapshot states 229, where the timestamp is generated when the snapshot stats 229 is generated.

Each snapshot state 229 can also include one or more deferred events 248. The deferred events 248 can represent revenue calculations as specified by the deferral schedule. The deferred events 248 can be associated with a particular date or time as specified by the deferral schedule. The deferred events 248 represent deferred revenue and/or deferred expenses associated with a particular subscription or other item corresponding to a transaction.

The client computing environment 206 can execute a transaction processor 281 that can process transactions for a subscription or any other item that requires deferred revenue calculations. In this sense, the transaction processor 281 is any application or service can submits requests to the endpoint 231 to create, manage and/or initiate deferrals or deferred revenue calculations via deferral calculation service 215.

For example, the transaction processor 281 can comprise an application that processes transactions on behalf of an electronic storefront. The transaction processor 281 can process a transaction for a subscription and forward a transaction record 285 corresponding to the transaction to the endpoint 231 of the deferral calculation service 215, which can generate a new deferral or update an existing deferral. To this end, the deferral calculation service 215 can generate snapshot state 229 that corresponds the deferral and also generate one or more deferred events 248 with which the snapshot state 229 can be populated according to a deferral schedule. The downstream data handler 217 can then publish the state of the deferral to a downstream service, such as a general ledger service or another data store.

Referring next to FIGS. 3-6, shown is a flowchart that provides one example of the operation of a portion of the deferral calculation service 215 according to various embodiments. It is understood that the flowcharts of FIGS. 3-6 provide merely an example of the many different types of functional arrangements that may be employed to implement the operation of the portion of the deferral calculation service 215 as described herein. As an alternative, the flowcharts of FIG. 3-5 can be viewed as depicting an example of elements of a method implemented in the computing environment 203 according to one or more embodiments. FIGS. 3-6 illustrate an example of how the deferral calculation service 215 can process a transaction record 285 and initiate deferred revenue calculations according to one example of the disclosure.

Beginning with box 301, the deferral calculation service 215 can obtain a transaction record 285 from a downstream client, such as a transaction processor 281. The transaction record 285 can include information about a transaction that the downstream client submits to the deferral calculation service 215 to perform deferred revenue calculations according to a deferral schedule. It certain embodiments, processed outlined in FIG. 3 can be performed by the endpoint 231.

At box 303, the deferral calculation service 215 can perform validation of the transaction record 285. In one embodiment, the transaction record 285 or request with which it is submitted can include data with which the submitting client can be authenticated, such as an API token, authentication credentials, or an authentication certificate. Additionally, the transaction record 285 can also include information with which a deferral within the data store 212 can be identified, such as a deferral identifier.

At 305, the deferral calculation service 215 can determine whether the transaction record 285 corresponds to an existing deferral in the data store 212. If the transaction record 285 does not correspond to an existing deferral, the deferral calculation service 215 can generate a new deferral in the data store 212 at box 307. In one embodiment, creating a new deferral within the data store 212 can involve generating deferral data 243 that corresponds to the deferral. The deferral data 243 can include a deferral schedule that is generated by the deferral calculation service 215 or provided by the transaction record 285. The deferral schedule can be user-specified by a user of the submitting client. Next, at box 309, the deferral calculation service 215 can generate a new snapshot state 229 that corresponds to the deferral associated with the transaction record 285. Next, the process can proceed to flowchart B, which is further depicted in FIG. 5.

Figure 4:
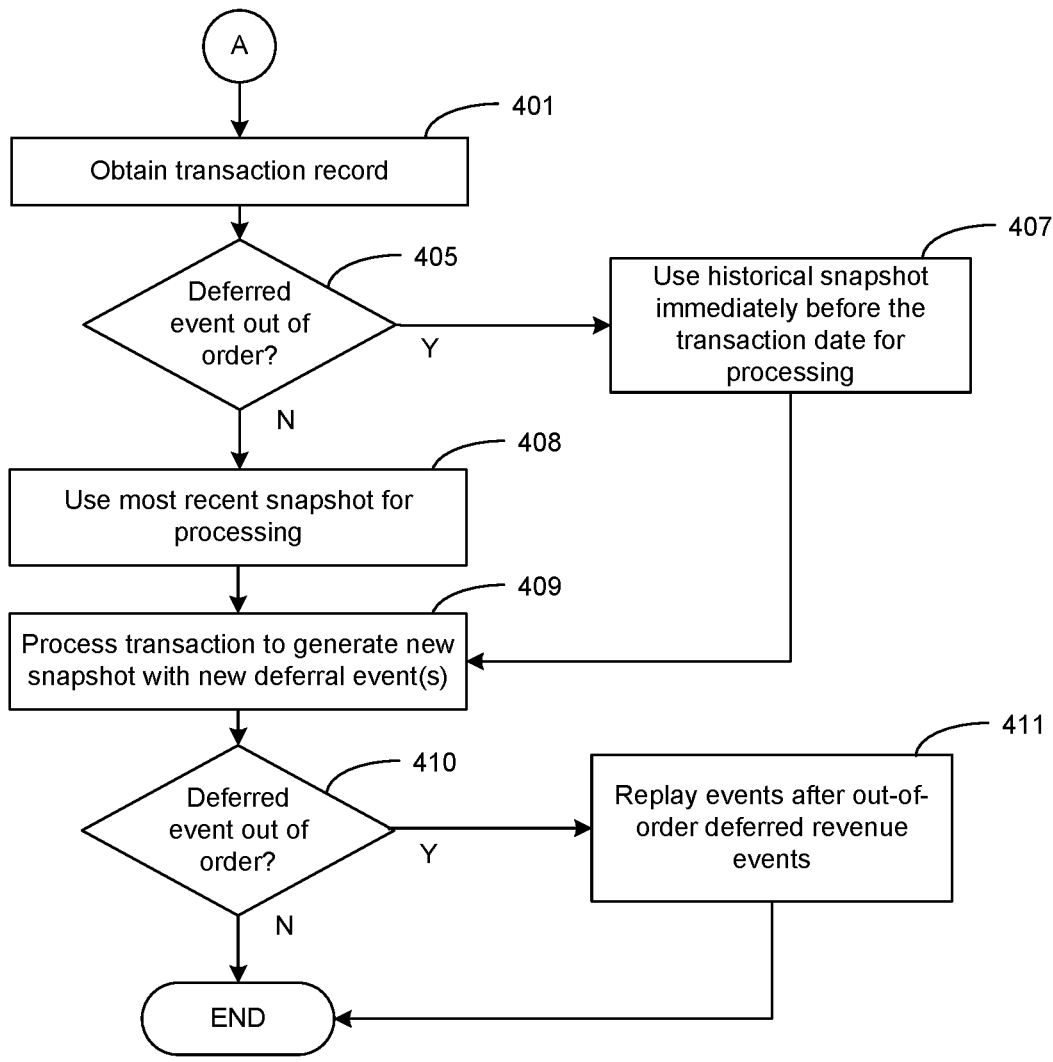

If the transaction record 285 does correspond to an existing deferral, the deferral calculation service 215 can proceed from box 305 to flowchart A, which is further depicted in FIG. 4.

Referring next to FIG. 4, shown is an example of how the history engine 233 can then determine whether a deferred revenue event corresponding to the transaction record 285 is an out of order event. First, at box 401, the history engine 233 can obtain the transaction record 285 received by the deferral calculation service 215. The transaction record 285 can be associated with a timestamp and a deferred event 248.

Next, at box 405, the history engine 233 can determine whether the deferred event 248 associated with the transaction record 285 is an out of order event. The history engine 233 can determine whether the deferred event 248 is an out of order event by determining whether other deferred events 248 associated with the snapshot state 229 are associated with a timestamp and is later in time than a timestamp associated with the deferred event 248. In other words, the history engine 233 can determine whether the deferred event 248 predates any other deferred event 248 associated with the current snapshot state 229.

If the deferred event 248 is an out of order event, the history engine 233 proceeds to box 407, where it designates the snapshot state 229 associated with the deferral that immediately precedes the timestamp of the transaction record 285 as the snapshot state 229 that will be used to perform deferral calculations. If the deferred revenue event is not an out of order event, the history engine 233 proceeds to box 408, where the history engine 233 designates the most recent snapshot as the snapshot state 229 that will form the basis for deferral calculations.

Next, at step 409, the history engine can process the transaction record containing new deferred events 248 and generate a new snapshot state 229 by copying the snapshot state 229 designated as the basis for deferral calculations. The process then proceeds to box 410, where the history engine determines whether any new deferred events 248 are out of order events. If not, the process can proceed to completion. If so, the process can proceed to box 411, where the history engine 233 can initiate replay of the deferred events 248 that are predated by the newly generated deferred event 248 corresponding to the transaction record 285. In one embodiment, the history engine 233 may immediately perform replay of the predated deferred events 248. Instead, the history engine 233 can mark the deferred events 248 for replay or recalculation by the worker 237. Thereafter, the process depicted in FIG. 4 deferred event 248deferred event 248deferred event 248deferred event 248deferred event 248deferred event 248deferred events 248can proceed to completion, which returns the execution of the deferral calculation service 215 to FIG. 3, where the process proceeds to flowchart B, illustrated in FIG. 5.

Figure 3:
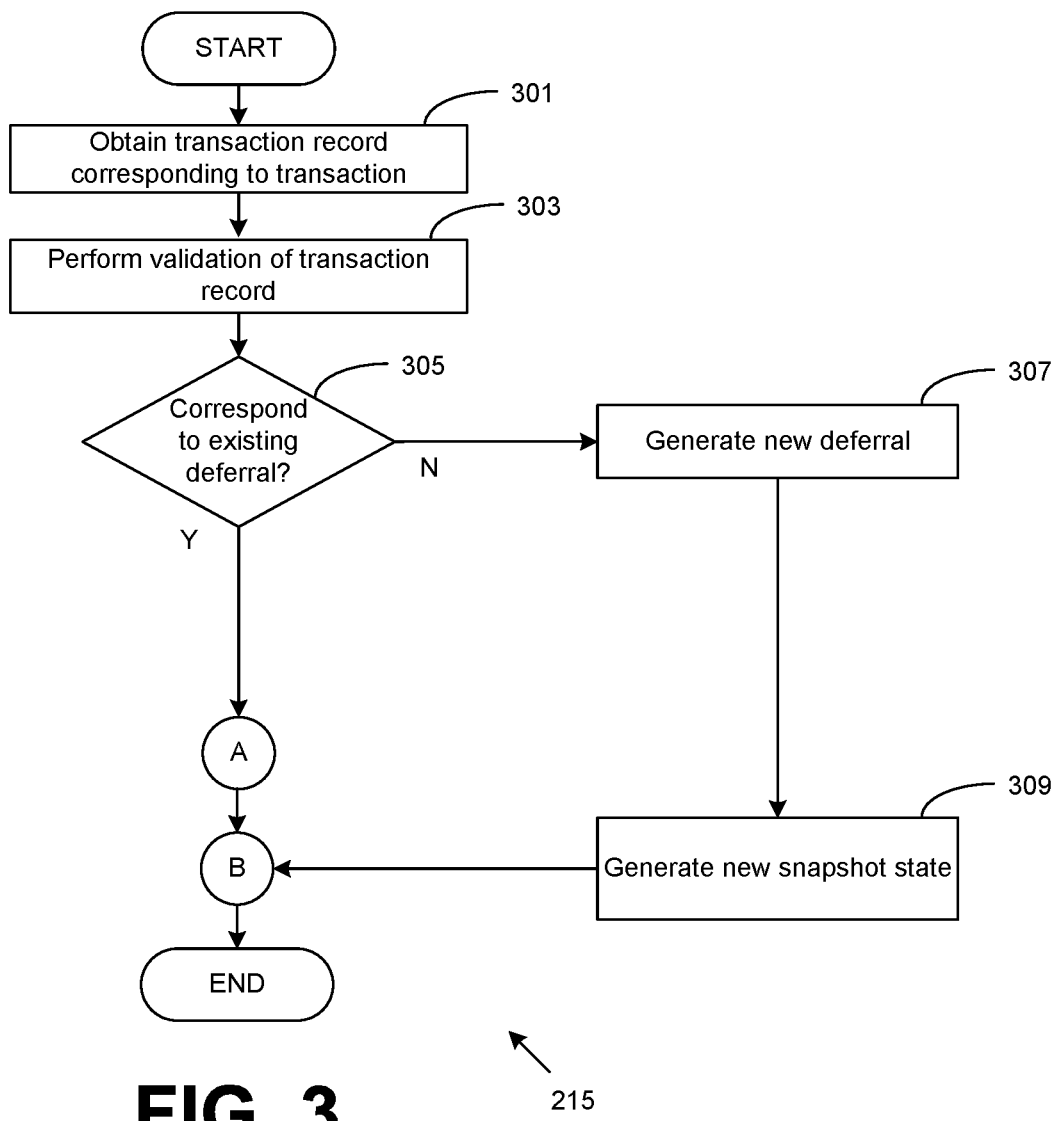
FIGS. 3-6 are flowcharts illustrating examples of functionality implemented as portions of a computing environment in the networked environment of FIG. 2 according to various embodiments of the present disclosure.
Figure 5:
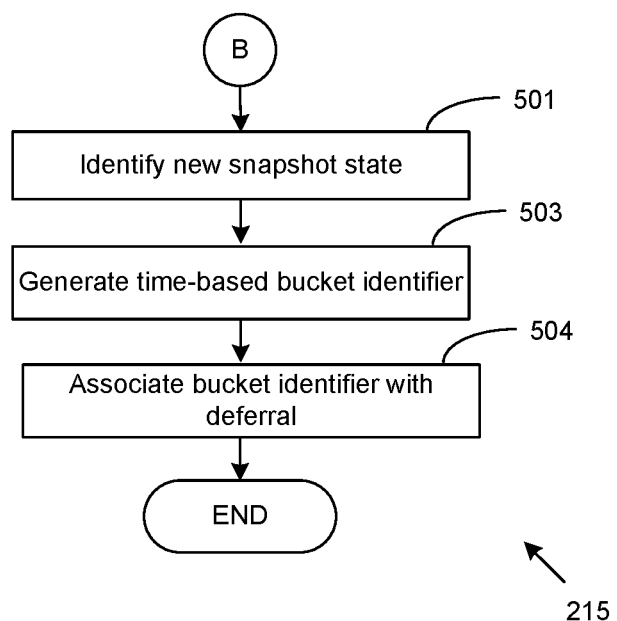

In FIG. 3, upon completion of flowchart A, the process can proceed to flowchart B, depicted in FIG. 5. FIG. 5 illustrates how the deferral calculation service 215 can assign a bucket identifier 242 to a snapshot state 229. The bucket identifier 242 is based upon a timestamp that identifies when the worker 237 should visit the snapshot state 229 to perform deferred revenue calculations. The functionality illustrated in FIG. 5 can also be performed by the worker 237 or the endpoint 231.

First, at box 501, the deferral calculation service 215 can identify the new snapshot state 229 generated for the deferral. At box 503, the deferral calculation service 215 can generate a time-based identifier as the bucket identifier 242. The bucket identifier 242 can be based upon a random point in time between when the transaction record 285 is transmitted to the deferral calculation service 215 and when deferred revenue calculations are due or by a calculation deadline. The deferred revenue calculations can be identified as due as specified by the deferral schedule associated with the deferral. The deferred revenue calculations can be specified as due as of the date of the newly generated deferred event 248, which is a date at a future point in time. The deferred revenue calculations can also be specified as due at a particular due date based upon an accounting calendar or any other type of due date from the date of the transaction record 285. By selecting a random point in time as a timestamp at which the deferred revenue calculations will be performed for the snapshot state 229, the load on computing resources can be spread throughout a calendar time period.

At box 504, the deferral calculation service 215 can associate the bucket identifier 242 with the deferral, which indicates to the worker 237 when to visit the deferral and/or the current snapshot state 229 for the deferral in order to perform deferred revenue calculations. Thereafter, the process depicted in FIG. 5 can end, which can return execution of the deferral calculation service 215 to FIG. 3, after which the process in FIG. 3 can proceed to completion.

Figure 6:
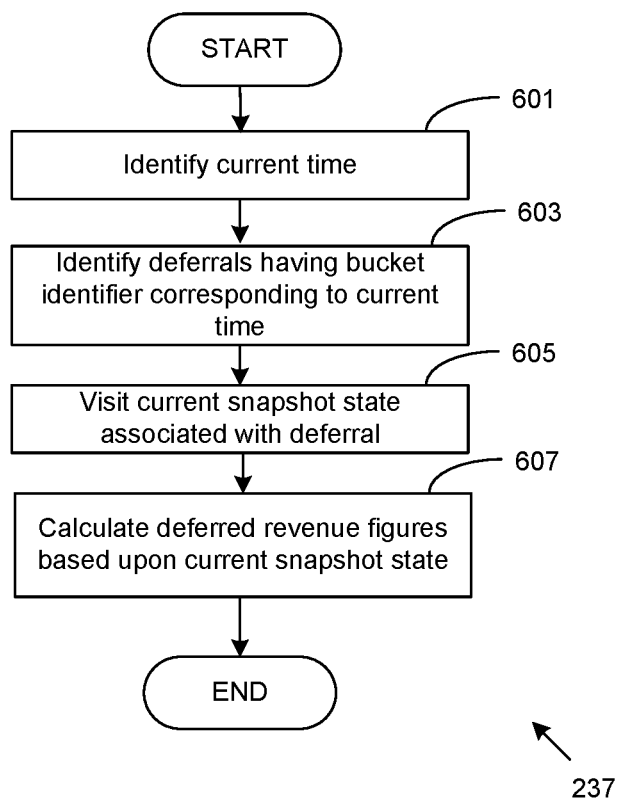

FIG. 6 illustrates how the worker 237 can periodically visit deferrals to perform deferred revenue calculations. The process depicted in FIG. 6 can be executed asynchronously from the process illustrated in FIGS. 3-5. In one example, the deferral calculation service 215, when a new deferred event 248 or a current snapshot state 229 is generated, can generate a bucket identifier 242 based upon a random future point in time between when the deferred event 248 is created and a due date for the calculations. Additionally, the worker 237 can be a background and/or multi-threaded process that performs deferred revenue calculations periodically when a deferral with a bucket identifier 242 corresponding to the current time is identifier. There could be many deferrals in the data store 212 with such a bucket identifier 242.

Accordingly, at box 601, the worker 237 can determine a current time. Next, at box 603, the worker 237 can identify deferrals having a bucket identifier 242 associated with the current time. The deferrals associated with the current time can be quickly identified in some examples when the deferral state index 225 is stored in a relational database. At box 605, the worker 237 can visit the deferrals associated with the current time. In this sense, visiting a deferral can mean identifying the latest snapshot 241 associated with a deferral linked to the bucket identifier 242 and then identifying the snapshot state 229 corresponding to the latest snapshot 241. Next, at box 607, the worker 237 can process the snapshot state 229 by performing deferred revenue calculations for the snapshot state 229 to generate the current state of the deferral. The worker 237 skips those deferrals that are not associated with the current time, thereby reducing the load on computing resources by not performing deferred revenue calculations for all deferrals at once.

As noted above, the worker 237 can replay or recalculate deferred events 248 associated with a snapshot state 229 that have been previously calculated that are predated by a newly generated deferred event 248. Thereafter, the process depicted in FIG. 6 can end, which returns execution to FIG. 3. The process in FIG. 3 can therefore end. In some examples of the disclosure, the downstream data handler 217 can then publish the current state of the deferral to a downstream system such as a general ledger system.

Figure 7:
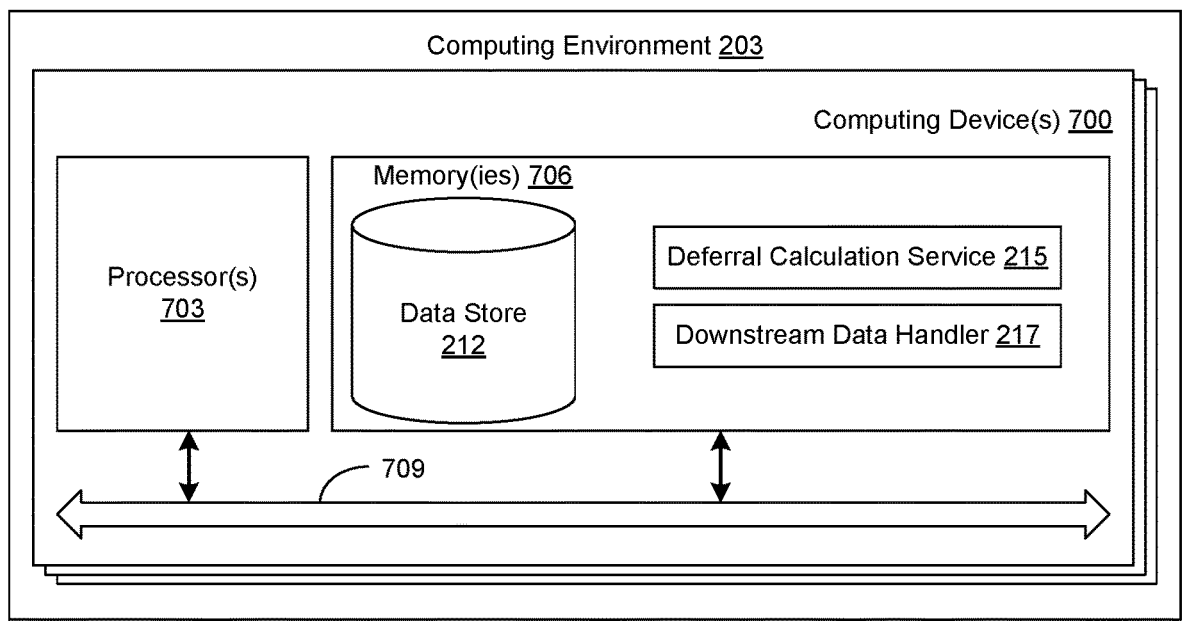
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the deferral calculation service 215 the downstream data handler 217, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the deferral calculation service 215, the downstream data handler 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the deferral calculation service 215 and the downstream data handler 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the deferral calculation service 215 and the downstream data handler 217, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the deferral calculation service 215 and the downstream data handler 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A method, comprising:
   obtaining, via at least one computing device, a transaction record corresponding to a transaction;
   identifying, via the at least one computing device, a deferral record in a data store that corresponds to the transaction record, the deferral record being associated with a plurality of snapshot states, wherein each of the snapshot states expresses a plurality of deferred events associated with the deferral record at a respective point in time;
   generating, via the at least one computing device, at least one deferred event corresponding to the transaction record;
   generating, via the at least one computing device, a new snapshot state corresponding to the deferral record, the new snapshot state including the at least one deferred event and a plurality of deferred events from a most recent snapshot state;
   determining, via the at least one computing device, whether the at least one deferred event predates at least one of the deferred events from the most recent snapshot state;
   assigning a bucket identifier to the new snapshot state, the bucket identifier comprising a timestamp that identifies a randomly chosen time prior to a deferral due date by when deferral calculations associated with the new snapshot state should be completed;
   recalculating, via the at least one computing device, a respective revenue figure for the at least one deferred event and the deferred events from the most recent snapshot state, the recalculating performed at the randomly chosen time; and
   generating, via the at least one computing device, a state of the deferral record based upon the new snapshot state, wherein generating the state of the deferral record is performed at the randomly chosen time that is between when the transaction record is obtained and a calculation deadline.

2. The method of claim 1, further comprising determining, via the at least one computing device, the calculation deadline associated with the at least one deferred event based upon a deferral date.

3. The method of claim 1, further comprising generating an identifier for the new snapshot state based upon the randomly chosen time.

4. The method of claim 1, further comprising generating a state of a plurality of deferral records having a snapshot state with an identifier based upon the randomly chosen time and skipping generation of a state of other ones of the plurality of deferral records without a snapshot state with the identifier based upon the randomly chosen time.

5. The method of claim 1, wherein the plurality of snapshot states associated with the deferral record are arranged in a linked list and ordered according to timestamp.

6. The method of claim 1, further comprising publishing the state of the new snapshot state to a downstream general ledger via an application programming interface (API) associated with the general ledger.

7. The method of claim 1, wherein generating the state of the deferral record based upon the new snapshot state further comprises designating the new snapshot state as the current state of the deferral record.

8. The method of claim 1, further comprising executing at least one test scenario based upon the deferral record, wherein the at least one test scenario comprises a pointer to the current state of the deferral record.

9. The method of claim 8, wherein executing the at least one test scenario further comprises generating a copy of the new snapshot state when the at least one test scenario calls for a modification to the current state of the deferral record.

10. A system, comprising:
    at least one computing device; and
    an application executable by the at least one computing device, wherein the application, when executed, causes the at least one computing device to at least:
      obtain a transaction record corresponding to a transaction;
      identify a deferral record in a data store that corresponds to the transaction record, the deferral record being associated with a plurality of snapshot states, wherein each of the snapshot states expresses a plurality of deferred events associated with the deferral record at a respective point in time;
      generate at least one deferred event corresponding to the transaction record;
      generate a new snapshot state corresponding to the deferral record, the new snapshot state including the at least one deferred event and a plurality of deferred events from a most recent snapshot state;
      determine whether the at least one deferred event predates at least one of the deferred events from the most recent snapshot state;
      assign a bucket identifier to the new snapshot state, the bucket identifier comprising a timestamp that identifies a randomly chosen time prior to a deferral due date by when deferral calculations associated with the new snapshot state should be completed;
      recalculate a respective revenue figure for the at least one deferred event and the deferred events from the most recent snapshot state, the recalculating performed at the randomly chosen time; and
      generate a state of the deferral record based upon the new snapshot state, wherein generating the state of the deferral record is performed at the randomly chosen time that is between when the transaction record is obtained and a calculation deadline.

11. The system of claim 10, wherein the application further causes the at least one computing device to at least:
    determine the calculation deadline associated with the at least one deferred event based upon a deferral date, and wherein generating the state of the deferral record is performed prior to the calculation deadline.

12. The system of claim 10, wherein the application further causes the at least one computing device to at least:
    generate an identifier for the new snapshot state based upon the randomly chosen time.

13. The system of claim 10, wherein the application further causes the at least one computing device to at least:
    generate a state of a plurality of deferral records having a snapshot state with an identifier based upon the randomly chosen time and skipping generation of a state of other ones of the plurality of deferral records without a snapshot state with the identifier based upon the randomly chosen time.

14. The system of claim 10, wherein the plurality of snapshot states associated with the deferral record are arranged in a linked list and ordered according to timestamp.

15. The system of claim 10, wherein the application further causes the at least one computing device to at least:

publish the state of the new snapshot state to a downstream general ledger via an application programming interface (API) associated with the general ledger.

16. The system of claim 10, wherein generating the state of the deferral record based upon the new snapshot state further comprises designating the new snapshot state as the current state of the deferral record.

17. The system of claim 10, wherein the application further causes the at least one computing device to at least:
execute at least one test scenario based upon the deferral record, wherein the at least one test scenario comprises a pointer to the current state of the deferral record.

18. The system of claim 17, wherein executing the at least one test scenario further comprises the application further causes the at least one computing device to generate a copy of the new snapshot state when the at least one test scenario calls for a modification to the current state of the deferral record.

19. A non-transitory computer-readable medium stored in a memory embodying instructions executable by a processor, the instructions, when executed, causing the processor to at least:
obtain a transaction record corresponding to a transaction;
identify a deferral record in a data store that corresponds to the transaction record, the deferral record being associated with a plurality of snapshot states, wherein each of the snapshot states expresses a plurality of deferred events associated with the deferral record at a respective point in time;
generate at least one deferred event corresponding to the transaction record;
generate a new snapshot state corresponding to the deferral record, the new snapshot state including the at least one deferred event and a plurality of deferred events from a most recent snapshot state;
determine whether the at least one deferred event predates at least one of the deferred events from the most recent snapshot state;
assign a bucket identifier to the new snapshot state, the bucket identifier comprising a timestamp that identifies a randomly chosen time prior to a deferral due date by when deferral calculations associated with the new snapshot state should be completed;
recalculate a respective revenue figure for the at least one deferred event and the deferred events from the most recent snapshot state, the recalculating performed at the randomly chosen time; and
generate a state of the deferral record based upon the new snapshot state, wherein generating the state of the deferral record is performed at the randomly chosen time that is between when the transaction record is obtained and a calculation deadline.

20. The non-transitory computer-readable medium of claim 19, wherein the instructions further causing the processor to at least:
generate a state of a plurality of deferral records having a snapshot state with an identifier based upon the randomly chosen time and skipping generation of a state of other ones of the plurality of deferral records without a snapshot state with the identifier based upon the randomly chosen time.

* * * * *